(12) United States Patent
Mirsky et al.

(10) Patent No.: US 10,468,144 B2
(45) Date of Patent: Nov. 5, 2019

(54) SPENT FUEL STORAGE RACK

(71) Applicant: NuScale Power, LLC, Corvallis, OR (US)

(72) Inventors: Stephen M. Mirsky, Corvallis, OR (US); Jose N. Reyes, Jr., Corvallis, OR (US)

(73) Assignee: NUSCALE POWER, LLC, Portland, OR (US)

( * ) Notice: Subject to any disclaimer, the term of this patent is extended or adjusted under 35 U.S.C. 154(b) by 644 days.

(21) Appl. No.: 14/820,389

(22) Filed: Aug. 6, 2015

(65) Prior Publication Data

US 2016/0055927 A1    Feb. 25, 2016

Related U.S. Application Data

(60) Provisional application No. 62/039,311, filed on Aug. 19, 2014.

(51) Int. Cl.
| | |
|---|---|
| *G21C 19/00* | (2006.01) |
| *G21C 19/07* | (2006.01) |
| *G21C 19/40* | (2006.01) |
| *G21C 19/08* | (2006.01) |
| *G21F 7/015* | (2006.01) |
| *G21C 15/18* | (2006.01) |

(52) U.S. Cl.
CPC ............ *G21C 19/07* (2013.01); *G21C 15/18* (2013.01); *G21C 19/08* (2013.01); *G21C 19/40* (2013.01); *G21F 7/015* (2013.01); *Y02E 30/40* (2013.01)

(58) Field of Classification Search
CPC . G21F 5/00; G21F 5/005; G21F 5/008; G21F 5/012; G21F 5/06; G21F 5/10
See application file for complete search history.

(56) References Cited

U.S. PATENT DOCUMENTS

| | | |
|---|---|---|
| 4,039,842 A | 8/1977 | Mollon |
| 4,171,002 A | 10/1979 | Smith |
| 6,519,307 B1 | 2/2003 | Singh et al. |

(Continued)

FOREIGN PATENT DOCUMENTS

WO    2014/189152 A2    11/2014

OTHER PUBLICATIONS

Listing of Related Cases; May 18, 2016.

*Primary Examiner* — Marshall P O'Connor

(74) *Attorney, Agent, or Firm* — Schwabe Williamson & Wyatt

(57) ABSTRACT

A system for storing nuclear fuel assemblies includes a plurality of cells housed within a support structure. A first cell may house a first fuel assembly and a second cell may house a second fuel assembly. A plurality of compartments separate the plurality of cells and provide passageways for coolant entering a bottom end of the support structure to remove heat from the nuclear fuel assemblies. A first perforation transfers coolant between the first cell and one or more of the compartments, and a second perforation transfers coolant between the second cell and the one or more compartments. At least a portion of the coolant entering the bottom end of the support structure is transferred between the plurality of cells and the plurality of compartments. Two or more fuel storage racks may be stacked together in alternating fuel patterns to facilitate cooling the fuel assemblies with liquid or air.

17 Claims, 11 Drawing Sheets

(56) References Cited

U.S. PATENT DOCUMENTS

| | | |
|---|---|---|
| 7,068,748 B2 | 6/2006 | Singh |
| 7,330,526 B2 | 2/2008 | Singh |
| 7,590,213 B1 | 9/2009 | Singh |
| 7,676,016 B2 * | 3/2010 | Singh .................. G21F 5/10 |
| | | 250/506.1 |
| 7,786,456 B2 | 8/2010 | Singh et al. |
| 7,933,374 B2 | 4/2011 | Singh |
| 7,993,374 B2 | 4/2011 | Singh |
| 7,994,380 B2 | 8/2011 | Singh et al. |
| 8,098,790 B2 | 1/2012 | Singh |
| 8,223,914 B2 | 7/2012 | Maeda |
| 8,351,562 B2 | 1/2013 | Singh |
| 8,415,521 B2 | 4/2013 | Singh et al. |
| 8,548,112 B2 | 10/2013 | Singh et al. |
| 8,624,211 B2 | 1/2014 | Kibata et al. |
| 9,001,958 B2 | 4/2015 | Singh et al. |
| 9,058,906 B2 | 6/2015 | Schmidt et al. |
| 9,105,365 B2 | 8/2015 | Singh et al. |
| 9,208,906 B2 | 12/2015 | Harkness |
| 2011/0286567 A1 * | 11/2011 | Singh .................. G21C 19/07 |
| | | 376/272 |
| 2012/0082285 A1 | 4/2012 | Mukai |
| 2013/0322589 A1 | 12/2013 | Bracey |
| 2014/0254737 A1 | 9/2014 | Reyes, Jr. |

\* cited by examiner

SPENT FUEL STORAGE RACK

STATEMENT OF RELATED MATTERS

This application claims priority to U.S. Provisional Patent Application No. 62/039,311 filed on Aug. 19, 2014, the contents of which are herein incorporated by reference.

GOVERNMENT INTEREST

This invention was made with Government support under Contract No. DE-NE0000633 awarded by the Department of Energy. The Government has certain rights in this invention.

TECHNICAL FIELD

This disclosure generally relates to systems, devices, structures, and methods for storing nuclear fuel, including the storage of spent fuel assemblies.

BACKGROUND

Spent fuel pools may be configured to provide short-term and/or long-term decay heat removal from irradiated fuel that has been removed from a nuclear reactor. The most recently removed spent fuel may represent the largest source of heat generation in a spent fuel pool. In the event of a complete loss of power to the nuclear power plant or a structural failure of the spent fuel pool containment, cooling systems for the spent fuel pool may not be available to sufficiently remove the fuel's decay heat. For prolonged nuclear plant station blackout conditions, the potential exists to boil off all of the water in the spent fuel pool thereby overheating and subsequently damaging the spent fuel and/or spent fuel cladding.

For the purpose of criticality control, some types of spent fuel storage rack designs may incorporate solid neutron absorbers, such as boron-carbide plates, between each fuel assembly storage position (e.g., cell). The loss of coolant within the spent fuel pool may result in the possibility of rapid zircaloy cladding oxidation or the initiation of a zircaloy fire and subsequent release of radionuclides. Additives such as soluble boron may be provided in a fuel storage pool in order to help maintain subcriticality of spent fuel. Numerous degradation issues to various components may occur over time. Additionally, while the preferential loading of hotter fuel assemblies with colder fuel assemblies may be used to lessen the exchange of heat between adjacent spent fuel assemblies, the effective placement of the fuel assemblies depends on consistent record keeping and is subject to human error. As nuclear reactors may be licensed to continue operating over a period of decades, the spacing and cooling demands on the spent fuel pool are likely to increase with the build-up in spent fuel.

This application addresses these and other problems.

SUMMARY

A system for storing nuclear fuel assemblies is disclosed herein, comprising a plurality of cells housed within a support structure. A first cell may be configured to house a first fuel assembly and a second cell may be configured to house a second fuel assembly. A plurality of compartments may be configured to separate the plurality of cells and to provide passageways for coolant entering a bottom end of the support structure to remove heat from the nuclear fuel assemblies. A first perforation transfers coolant between the first cell and one or more of the compartments, and a second perforation transfers coolant between the second cell and one or more compartments. At least a portion of the coolant entering the bottom end of the support structure may be transferred between the plurality of cells and the plurality of compartments.

A method for storing nuclear fuel in a stacked fuel arrangement is disclosed herein. A first storage rack is located within a cooling pool, and the first storage rack may comprise a first group of cells arranged in a first grid structure. The first group of cells may be configured to store a first group of fuel assemblies. A first fuel assembly may be placed in a first cell of the first grid structure, and a second fuel assembly may be placed in a second cell of the first grid structure. The method may comprise circulating coolant through an intermediate cell located between the first cell and the second cell. The intermediate cell may form a through-channel that provides a substantially unimpeded flow of the coolant through the first storage rack. A second storage rack may be mounted on top of the first storage rack. The second storage rack may comprise a second group of cells arranged in a second grid structure, and the second group of cells may be configured to store a second group of fuel assemblies. An additional fuel assembly may be placed in an upper cell of the second grid structure, located directly above the intermediate cell of the first grid structure. Additionally, the method may comprise circulating the coolant through the intermediate cell to cool the additional fuel assembly in the upper cell.

A further system for storing nuclear fuel assemblies is disclosed herein. A containment structure comprising a plurality of walls may be configured to house a coolant reservoir at a level associated with normal operation. An intermediate barrier may be located within the containment structure, having a height that is lower than the plurality of walls of the containment structure. A main cooling pool may be located on a first side of the intermediate barrier, and a spent fuel cooling pool may be located on a second side of the intermediate barrier. Coolant from the coolant reservoir located above the intermediate barrier may be circulated between the spent fuel cooling pool and the main cooling pool during the normal operation. The intermediate barrier may be configured to maintain a top surface of the spent fuel cooling pool at approximately the height of the intermediate barrier in response to the level of the coolant reservoir falling below the height of the intermediate barrier.

DETAILED DESCRIPTION

Various examples disclosed and/or referred to herein may be operated consistent with, or in conjunction with, one or more features found in U.S. application Ser. No. 13/786,643, filed on Mar. 6, 2013 and entitled Managing Nuclear Reactor Spent Fuel Rods, which is herein incorporated by reference in its entirety.

Figure 1:
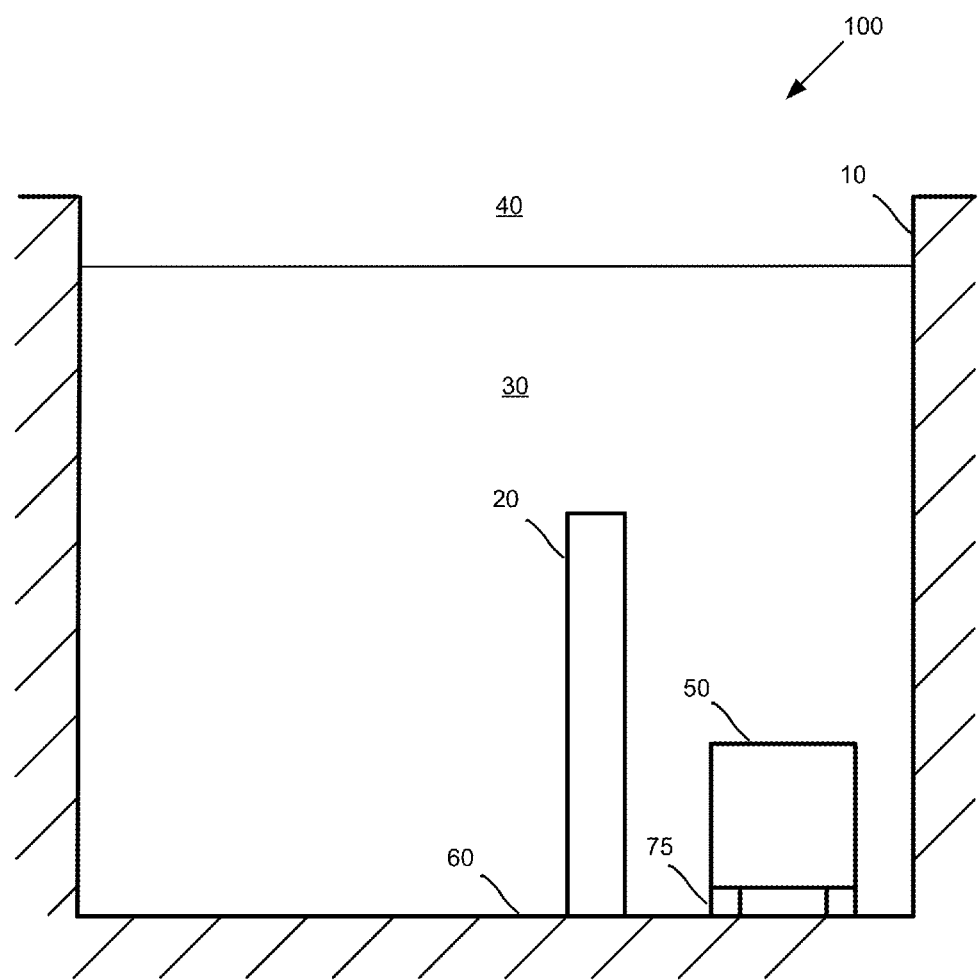
FIG. 1 illustrates an example spent fuel storage system.

FIG. 1 illustrates an example spent fuel storage system 100. Spent fuel storage system 100 may comprise spent nuclear fuel that has been removed from one or more nuclear reactors and transferred to spent fuel storage system 100 to facilitate the removal of residual decay heat produced by the spent fuel. In some examples, spent fuel management system 100 may comprise a spent fuel rack 50 submerged in a fluid 30, such as water. Fluid 30 provides a heat sink for receiving and dissipating the decay heat from the spent fuel stored in spent fuel rack 50.

Fluid 30 may be contained as a pool of liquid formed between a plurality of walls, such as a containment wall 10. In some examples, containment wall 10 may be associated with a nuclear reactor containment building. The containment building may be filled with air 40. Spent fuel management system 100 may be configured to prohibit air 40 and/or any gases produced by the spent fuel stored in fluid 30 from being released out of the containment building and into to the surrounding environment. In some examples, containment wall 10 and/or a containment floor 60 may comprise reinforced concrete. Additionally, fluid 30 may be stored below ground level such that the earth surrounding containment wall 10 and floor 60 provides an additional heat sink for any heat generated by the spent fuel.

Spent fuel rack 50 may comprise, and/or be placed on, one or more support structures 75. The support structures 75 may be configured to raise the spent fuel rack 50 some distance from containment floor 60 to facilitate the flow of fluid 30 below and through the spent fuel. In some examples the distance between spent fuel rack 50 and containment floor 60 may be approximately six inches to one foot.

A barrier 20 may be placed within fluid 30 to form an intermediate barrier or wall between the spent fuel rack 50 and other systems or devices located within fluid 30. The volume of fluid 30 between barrier 20 and wall 20 may be considered as a spent fuel cooling pool. In some examples, one or more nuclear reactors may be operated within the same pool of fluid 30 as spent fuel rack 50. The one or more nuclear reactors may operate in a reactor bay which forms part of, or is fluidly connected to, the spent fuel cooling pool.

Barrier 20 may be shorter than the surrounding containment wall 10 such that spent fuel rack 50 may be lifted over barrier 20 while remaining completely submerged in fluid 30. Similarly, individual spent fuel assemblies may be lifted over barrier 20 while remaining completely submerged in fluid 30, so that the spent fuel assemblies may be transported from a nearby nuclear reactor module to spent fuel rack 50 without being removed from fluid 30. Additionally, fluid located above barrier 20 may be freely circulated between the spent fuel cooling pool and the reactor bay during normal operation. By using a common source of fluid both for the reactor bay and the spent fuel cooling pool, this effectively increases the available reservoir of fluid for cooling the spent fuel over a longer period of time.

Figure 2:
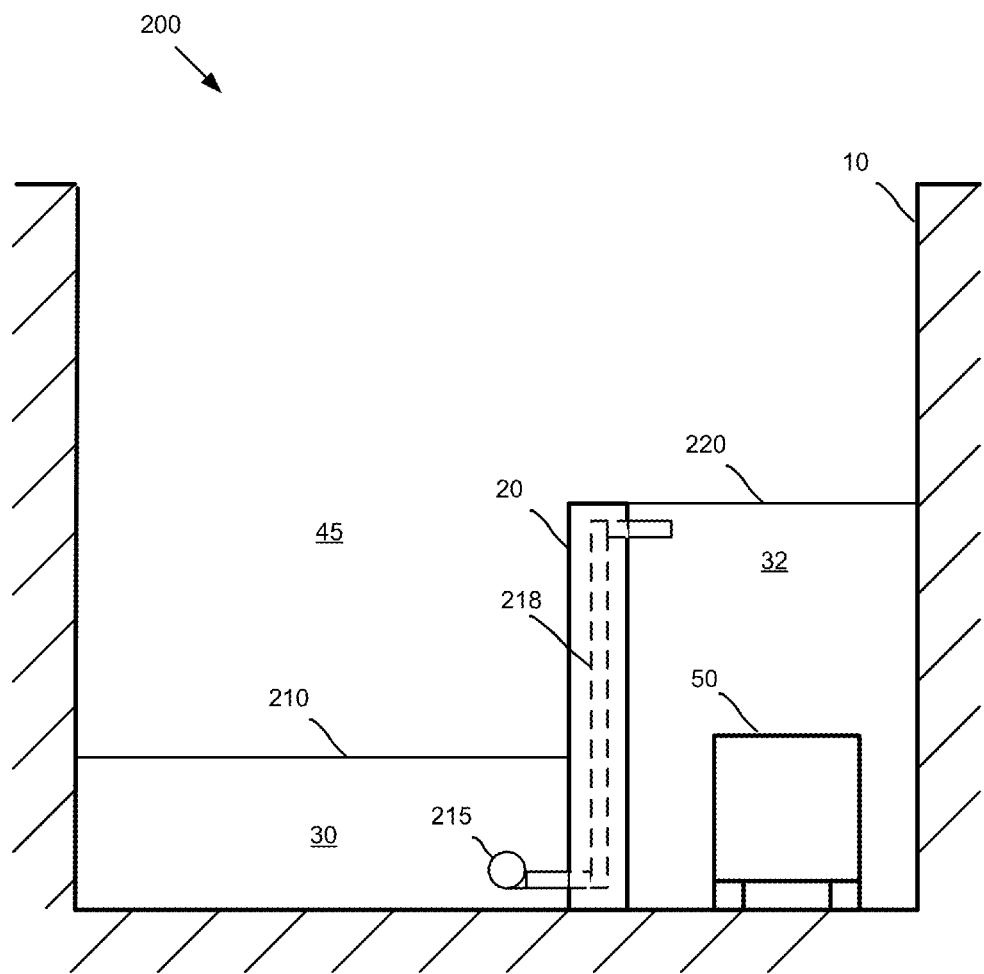
FIG. 2 illustrates an example spent fuel storage system including a spent fuel cooling pool.

FIG. 2 illustrates an example spent fuel storage system 200, similar to spent fuel storage system 100 of FIG. 1, including a spent fuel cooling pool 32 that is formed between barrier 20 and containment wall 10. In some examples, a reactor bay 45 may be located on an opposite side of barrier 20 and/or in an adjacent structure to spent fuel cooling pool 32. In the event of loss of coolant, such that the level 210 of fluid 30 within reactor bay 45 drops below the top of barrier 20, cooling pool 32 may retain sufficient fluid such that the level 220 of cooling pool 32 remains above spent fuel rack 50 and the spent fuel remains completely submerged in the fluid. Additionally, barrier 20 may be configured to maintain the level 220 corresponding to a top surface of spent fuel cooling pool 32 during the loss of coolant, at approximately the height of intermediate barrier 20 in response to the level of the fluid 30 falling below the height of intermediate barrier 20 in reactor bay 45.

Figure 3:
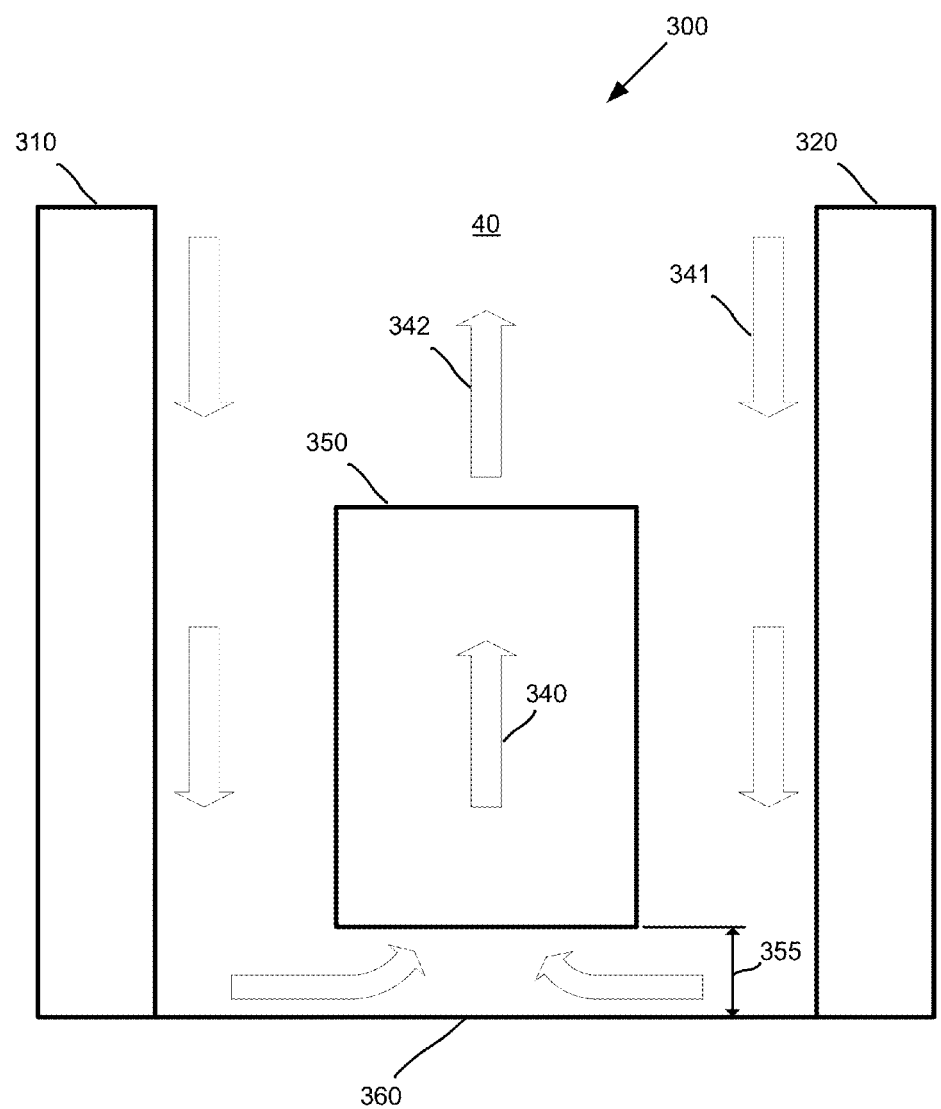
FIG. 3 illustrates an example spent fuel cooling system.

In some examples, fluid 30 may be pumped and/or diverted from the reactor bay 45 into the cooling pool 32 as the level 220 of fluid within cooling pool 32 decreases, e.g., due to evaporation. A pump 215 may be located at or near the bottom of reactor bay 45 and configured to pump fluid 30 into cooling pool 32 via one or more fluid makeup lines 218. Pump 25 may be configured to maintain a constant level of fluid within cooling pool 32. For example, the level 220 of fluid within cooling pool 32 may be maintained at or near the top of barrier 20. In some examples, the level 220 of fluid within cooling pool 32 may be maintained at or near the top of spent fuel rack 50. Reactor bay 45 may be configured to hold substantially more fluid 30 than cooling pool 32 to provide a long term reservoir of reserve water for both the spent fuel rack 50 and the one or more reactor modules that may be housed in reactor bay 45. FIG. 3 illustrates an example spent fuel cooling system 30. Spent fuel cooling system 30 may be configured to provide cooling of spent fuel after a loss of coolant has occurred. In some examples, spent fuel cooling system 30 may be configured to cool the spent fuel entirely by the flow of air 40 through a spent fuel rack 350.

Spent fuel cooling system 30 may comprise a plurality of containment walls, such as first containment wall 310 and second containment wall 320. In some examples, four or more walls of spent fuel cooling system 30 may surround spent fuel rack 350 about each side. In the event of loss of coolant, the spent fuel within spent fuel rack 350 will continue to generate heat. An inflow 341 of air (e.g., from within the surrounding containment building) may be drawn down past the containment walls 310, 320 towards containment floor 360. The inflow 341 may then be directed up through spent fuel rack 350 to remove heat from the spent fuel. An outflow 342 of air that exits spent fuel rack 350 will therefore have an increased temperature with respect to inflow 341.

The temperature difference between inflow 341 and outflow 342 will create a natural circulation of airflow 340 through spent fuel rack 350 to continually cool the spent fuel. Outflow 342 may be dissipated within the surrounding containment structure where it is cooled down as a result of circulation and convection prior to eventually returning as inflow 341. Spent fuel rack 350 may be raised away from containment floor 360 to increase the spacing and increase natural air circulation from underneath. The distance 355 between spent fuel rack 350 and containment floor 360 may be sized to provide the same flow rate of air underneath the spent fuel rack 350 as airflow 340 through the spent fuel rack 350. The distance 355 may be one or more inches. In some examples, airflow 340 may be augmented or assisted with a fan or blower in order to increase the air mass flow rate of air through the fuel rack 350.

Figure 4:
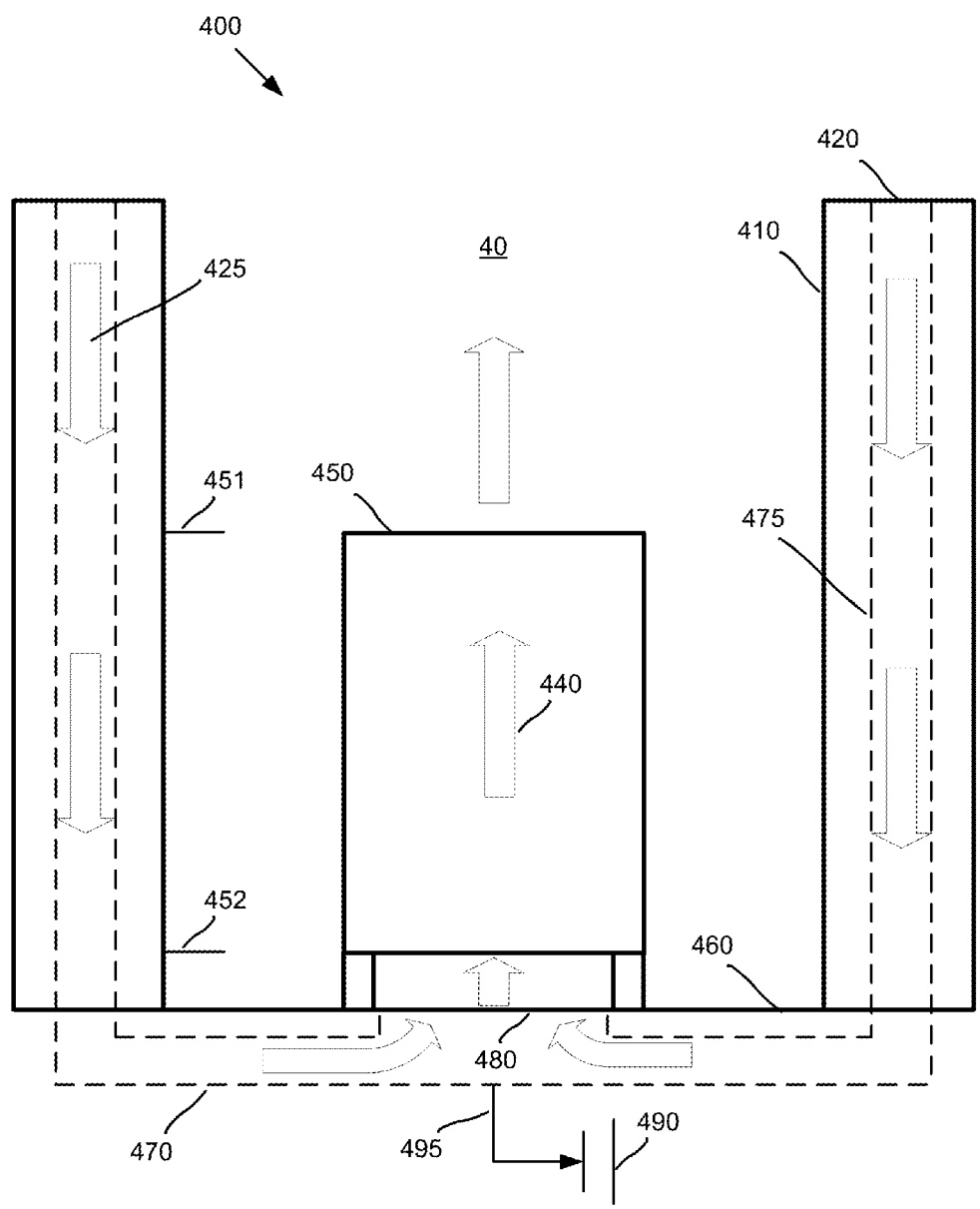
FIG. 4 illustrates an example spent fuel cooling system comprising an alternative cooling flow path.

FIG. 4 illustrates an example spent fuel cooling system 400 comprising an alternative cooling flow path 425. A spent fuel rack 450 may be positioned within a containment structure 410 comprising one or more walls. Below spent fuel rack 450, a vent 480 and/or opening may be configured to provide an airflow 440 through spent fuel stored in spent fuel rack 450. Vent 480 may be located beneath or approximately level to a containment floor 460.

In some examples, vent 480 may be operatively opened or closed according to different modes of operation of cooling system 400. For example, in a first mode of operation in which containment structure 410 stores a pool of fluid, vent 480 may be closed to prevent any of the fluid from escaping the containment structure 410. In the first mode of operation, the fluid may be used to cool the spent fuel being stored in spent fuel rack 450.

In a second mode of operation in which there is a loss of some or all of the fluid, vent 480 may be opened to facilitate the flow of air through spent fuel rack 450 in order to cool the spent fuel via airflow 440. Vent 480 may be located at an exit of a ventilation system comprising a passageway 470. In some examples, passageway 470 may be located beneath containment floor 460.

Additionally, passageway 470 may be connected to one or more channels 475 within containment structure 410. For example, channels 475 may provide a conduit for air 40 from within the containment structure 410 and/or from the surrounding environment to enter passageway 470 and be released out of vent 480. Channels 475 may comprise an inlet valve 420. Inlet valve 420 may be operable opened or closed according to the different modes of operation of cooling system 400 in a similar manner as vent 480.

In some examples, cooling system 400 may comprise a holding tank 490. In the event that the level of coolant within containment structure 410 falls below a predetermined level, one or more sensors such as a first sensor 451 and/or a second sensor 452 may be configured to identify a loss of coolant condition. First sensor 451 may be configured to detect the level of the coolant that falls below the top surface of spent fuel rack 450 and/or some other predetermined threshold level. Second sensor 452 may be configured to detect the level of the coolant that falls below the bottom surface of spent fuel rack 450 and/or some other predetermined threshold level.

Fluid that is located between the bottom of spent fuel rack 450 and containment floor 460 may impede the flow of air under and through spent fuel rack 450. In response to the loss of coolant, a release valve 495 may be actuated in order to remove the remaining fluid from within containment structure 410 and/or from below spent fuel rack 450, in order to increase airflow. In some examples, a warning/alarm may be triggered in response to a first signal received from first sensor 451 and the release valve 495 may be actuated in response to a second signal received from second sensor 452. The fluid removed from containment structure 410 may be stored in holding tank 490 which may be part of a spent fuel pool leak detection system. The fluid may be passively drained to holding tank 490 via release valve 495. In other examples, a pump and/or suction line may be used to remove the fluid from the bottom of containment structure 410 into holding tank 490. Although holding tank 490 is illustrated as being located below containment floor 460, in some examples the fluid may be pumped into an elevated holding tank such that there are no openings in containment floor 460 that would allow any fluid to inadvertently escape out of containment structure 410.

Similarly, although channels 475 and/or drain 480 are illustrated as being located within or below containment structure 410, some or all of flow path 425 and the various flow path components of cooling system 400 may be located outside of or above containment structure 410 to facilitate access to the components and/or to avoid penetrating containment structure 410. Once the fluid has been removed from within containment structure 410, cooling system 400 may be configured to cool the spent fuel via airflow 440.

In still other examples, holding tank 490 may be associated with a nearby and/or adjacent reactor bay, such as reactor bay 45 (FIG. 2). In response to first sensor 451 detecting a loss of coolant, cooling system 400 may be configured to draw fluid from the holding tank 490 in order to replenish and/or maintain the amount of fluid covering spent fuel rack 450. Fluid from the holding tank 490 may continue to be withdrawn for an initial period of time.

In the event that the fluid in holding tank 490 becomes depleted and/or otherwise unavailable, the level of fluid may eventually drop down to near the bottom of the spent fuel rack 450, at which time second sensor 452 may detect the lowered level of fluid. As discussed above, cooling system may then be configured to drain and/or otherwise transfer fluid into the holding tank 490. Accordingly, in various modes of operation, holding tank 490 may alternatively be used as either a source of additional makeup fluid or as a retainer for drained fluid.

In some examples, a sensor, such as second sensor 452, may be configured to monitor when a level of coolant in the spent fuel pool falls beneath a minimum threshold, and in response to the monitored level of coolant falling beneath the minimum threshold, a ventilation system may be configured to direct air into the fuel assemblies and the one or more through-channels of fuel rack 450.

Figure 5:
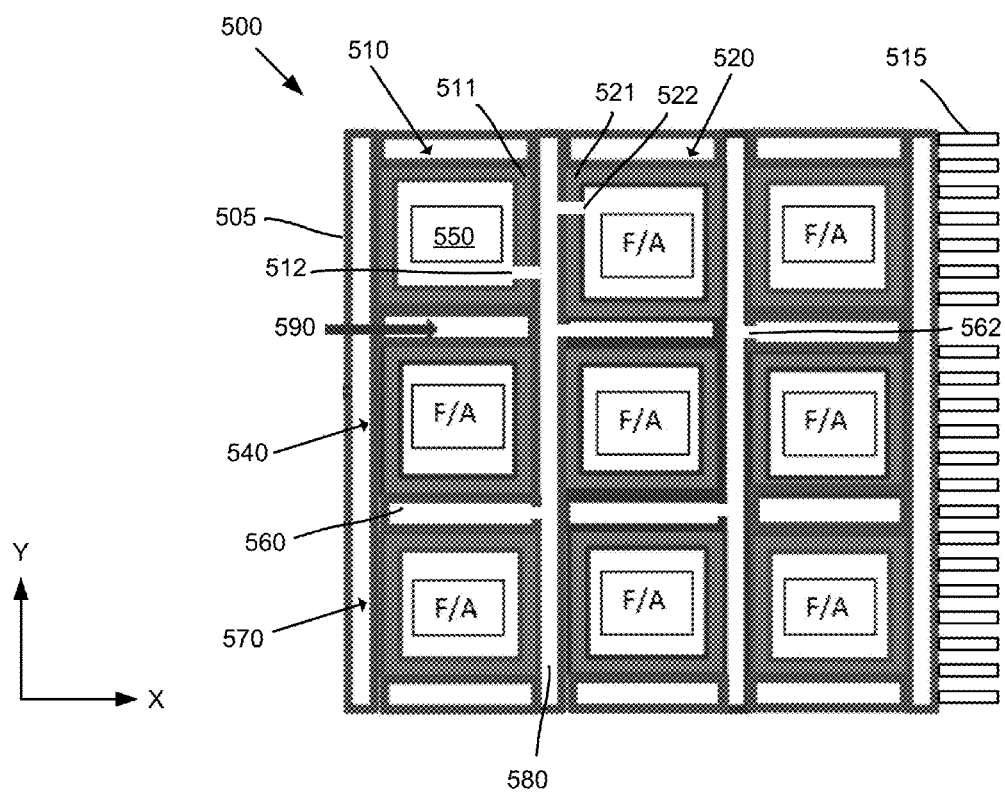
FIG. 5 illustrates a top view of an example spent fuel storage rack.

FIG. 5 illustrates a top view of an example spent fuel storage rack 500 comprising a plurality of cells, such as a first cell 510 and a second cell 520. In some examples, the plurality of cells may be arranged as a lattice of intersecting walls located within an outer containment wall 505. Each cell of spent fuel storage rack 500 may be configured to store a spent fuel assembly "F/A" such as spent fuel 550. Spent fuel storage rack 500 may comprise a plurality of multi-purpose isolation compartments 590.

Isolation compartments 590 may be configured to reduce heat transfer between adjacent spent fuel assemblies. For example, one or more of the isolation compartments 590 may separate adjacent spent fuel assemblies by a predetermined distance. The space and/or distance between spent fuel assemblies may act as a type of thermal barrier such that heat generated by spent fuel 550, for example, may be shielded from spent fuel in an adjacent cell, such as second cell 520.

Additionally, isolation compartments 590 may be configured to reduce and/or prohibit neutrons generated in spent fuel that is contained in one cell from being transferred or otherwise propagated to spent fuel contained in a second, or adjacent cell. Accordingly, one or more of the isolation compartments 590 may be configured as a neutron shield and/or as a neutron transport barrier.

In some examples, spent fuel storage rack 500 may be fabricated without any fixed neutron absorbers on the cell walls or other structures that surround each fuel assembly. Instead of relying on the presence of a material specifically added to a spent fuel rack to absorb radiated neutrons, a spacing of approximately one or more inches may be incorporated into isolation compartments 590 so that each fuel assembly is neutronically separated from the adjacent assemblies by at least that space on all four sides in the X-Y plane (a Z direction being normal to the X-Y plane). In some examples, the length (e.g., in the Z direction) of isolation compartments 590 may be approximately the same as the length of the associate spent fuel assemblies being stored in fuel storage rack 500.

One of skill in the art will appreciate that the size of isolation compartments 590 may vary according to geometry and type of spent fuel being stored. In some examples, the spacing between spent fuel assemblies may be between one and five inches for some types of fuel assemblies with an approximate outside dimension of eight inches. In other examples, the spacing may be five or more inches to accommodate larger or more active spent fuel assemblies. By selecting an appropriate separation distance between each fuel assembly storage cell, peak cladding temperatures may be maintained well below any ignition limit that may be designated or otherwise associated with the spent fuel assemblies in response to a partial and/or complete loss of coolant accident in the pool.

Isolation compartments 590 may be configured to form an orthogonal space around each fuel assembly to provide a neutron flux trap. Isolation compartments 590 may essentially isolate each fuel assembly from any neutronic interaction with adjacent cells, thereby providing for subcritical cooling of the entire spent fuel storage rack 500. The spacing provided by isolation compartments 590 may also be used to thermally isolate a spent fuel assembly from all adjacent cell assemblies, as discussed above.

In addition to providing the functions of reducing neutron transport and/or reducing heat transfer between adjacent spent fuel assemblies, isolation compartments 590 may be configured to provide a passageway for gas or fluid to flow between cells and to cool the associated spent fuel.

Isolation compartments 590 may comprise a plurality of compartments, such as a first compartment 560 and a second compartment 580. First compartment 560 may be formed at right angles to second compartment 580. One or more of isolation compartments 590 may be configured to separate two or more cells. For example, first compartment 560 may be configured to separate cell 540 from adjacent cell 570. On the other hand, an isolation compartment such as second compartment 580 may be configured to form a common separation between a plurality of cells. For example, second compartment 580 may be configured to separate first cell 510 from second cell 520, and similarly second compartment 580 may be configured to separate cell 540 and cell 570 from one or more additional cells.

First cell 510 may be formed by or within a first wall 511. First wall 511 may substantially surround first cell 510. Similarly, second cell 520 may be formed by or within a second wall 521. One or more of the isolation compartments 590, such as second compartment 580, may be formed between the first wall 511 and the second wall 521 of the adjacent fuel cells. In some examples, one or both of first wall 511 and second wall 521 may comprise a number of perforations, such as a first perforation 512, and a second perforation 522. The perforations may be configured to allow coolant (e.g., liquid or air) located within the first cell 510 and/or second cell 520 to flow into and/or from second compartment 580.

The one or more perforations in the first wall 511 may be offset and/or displaced from one or more perforations in the second wall 521. Offsetting the perforations may operate to preclude any line-of-sight paths between the fuel assemblies, such as between first fuel assembly 550 and a second fuel assembly located in second cell 520. Accordingly, neutrons generated in one fuel assembly may be prohibited from reaching and/or being absorbed in the other fuel assembly (i.e., to prevent neutron leakage between fuel assemblies located proximate to each other). In some examples, a plurality of perforations may be formed in the cell wall over the height or length of the corresponding fuel assembly in the Z direction, normal to the X-Y plane. The perforations may be configured to fluidly connect isolation compartments 590 and/or the plurality of cells to each other.

For example, first perforation 512 may be located at a first position adjacent a compartment, such as second compartment 580, separating first cell 510 from second cell 510. Second perforation 522 may be located at a second position adjacent compartment 580, and the second position my be offset from the first position so that first perforation 512 and second perforation 522 do not provide a line-of-sight between the first fuel assembly 550 and the fuel assembly in second cell 520.

The plurality of cells may be arranged in a grid pattern associated with the X-Y plane. The plurality of compartments may comprise a first set of compartments, such as first compartment 560, having a cross-sectional length oriented in the X direction of the X-Y plane, and a second set of compartments, such as second compartment 580, having a cross-sectional length oriented in the Y direction of the X-Y plane.

In some examples, the second position associated with second perforation 522 may be offset from the first position associated with first perforation 512 in the X-Y plane. In other examples, the second position may be offset from the first position in the Z direction, normal to the X-Y plane. Additionally, a third perforation, such as perforation 562, may be configured to transfer coolant between one or more of the first set of compartments and one or more of the second set of compartments.

In other examples, one or more of the compartments may be fluidly isolated from an adjacent compartment, such that fluid and/or air contained within one compartment may not freely flow into the adjacent compartment. In these examples, fluid and/or air may primarily or exclusively flow in the Z direction through the compartment.

The inner and outer surface of isolation compartments 590 that enclose spent fuel 550 in first cell 510 may be designed with features that enhance heat transfer to air flow in the event of loss of coolant. For example a number of perforations, such as perforation 562, may fluidly connect one or more compartments oriented in the X direction, such as compartment 560, with one or more compartments oriented in the Y direction, such as compartment 580. In addition to flowing in the Z direction, fluid and/or air contained within one compartment may also flow in the X and/or Y directions.

The spacing provided by isolation compartments 590 may be configured to provide both neutron containment and thermal isolation of adjacent cells without relying on any active systems or fixed neutron absorber plates affixed to the cell walls. Rather, spent fuel storage rack 500 may be configured to provide passive criticality and thermal heat-up safety in the event of loss of coolant.

Outer containment wall 505 and/or one or more of the cells associated with spent fuel storage rack 500 may comprise a surface treatment to facilitate the transfer of heat away from the spent fuel. For example, the surface treatment may comprise one or more fins 515 that increase an effective surface area of outer containment wall 505 and radiate heat away from the fuel assemblies into the surrounding air and/or liquid, similar to a heat sink.

Outer containment wall 505 may form an external support structure of the fuel storage rack, and the plurality of cells may be housed within the external support structure. One or more of the compartments 590 separating the plurality of cells may be configured to provide passageways for coolant entering a bottom end of the external support structure to remove heat from the nuclear fuel assemblies. At least a portion of the coolant entering the bottom end of the external support structure and travelling towards a top end of the external support structure may be transferred between the plurality of cells and the plurality of compartments via the one or more perforations.

Figure 6:
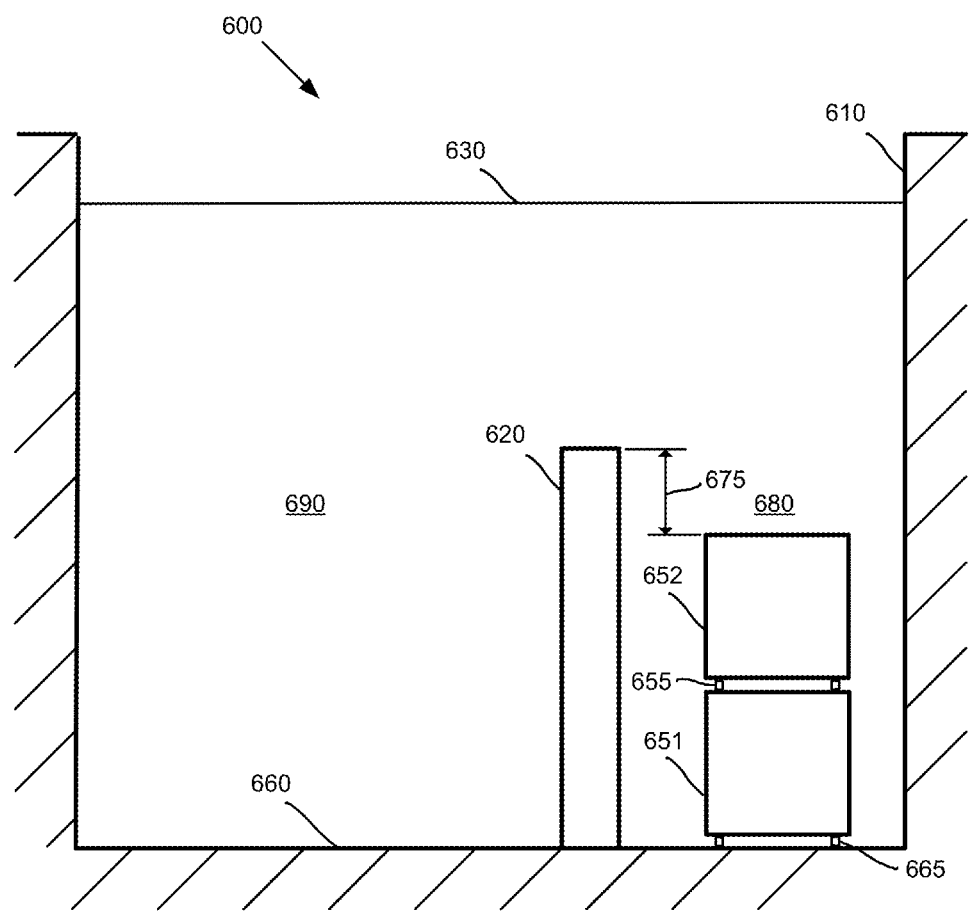
FIG. 6 illustrates an example spent fuel storage system comprising stacked fuel racks.

FIG. 6 illustrates an example spent fuel storage system 600 comprising stacked fuel racks. A first fuel rack 651 may be located on the bottom of the stack, closest to a floor 660 of a containment structure 610. First fuel rack 651 may be raised from floor 660 by some distance to allow for the circulation of fluid 630 under first fuel rack 651. For example, first fuel rack 651 may be supported on one or more lower supports 665. Additionally, a second fuel rack 652 may be stacked on first fuel rack 651. Second fuel rack 652 may be separated some distance from first fuel rack 651 by one or more stacking supports 655. Both first fuel rack 651 and second fuel rack 652 may be completely submerged in a pool of fluid 630 under one or more operating conditions of spent fuel storage system 600.

The pool of fluid 630 may be formed between one or more walls of containment structure 610. In some examples, a spent fuel cooling pool 680 may be formed between an intermediate barrier 620 and containment structure 610, similar to spent fuel cooling pool 32 of FIG. 2. Additionally, a main pool 690 may be located on an opposite side of intermediate barrier 620 as the spent fuel cooling pool 680. The height of intermediate barrier 620 may be lower than containment structure 610. In some examples, intermediate barrier 620 may be completely submerged in the pool of liquid 630.

The combined height of the stacked fuel racks may be lower than the height of intermediate barrier 620 by a distance 675. In the event that the level of liquid 630 in the main pool 690 falls below the top of intermediate barrier 620, the intermediate barrier 620 may be configured to maintain a sufficient amount of fluid 630 to keep the stacked fuel racks submerged under the fluid 630 by the distanced 675. Whereas spent fuel storage system 600 illustrates two stacked fuel racks, in some examples, more than two fuel racks may be stacked together within spent fuel cooling pool 680. For example, three or more fuel racks may be stacked on top of each other. In other examples, a plurality of stacked fuel racks may be located side by side each other in the spent fuel cooling pool 680.

Figure 7:
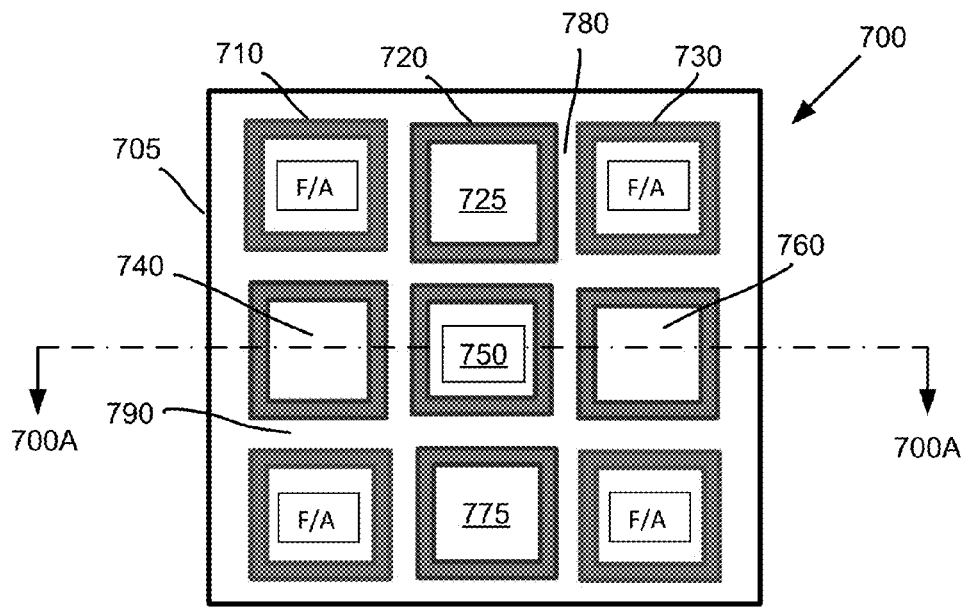
FIG. 7 illustrates a top view of an example spent fuel storage rack and a fuel assembly arrangement.

FIG. 7 illustrates a top view of an example spent fuel storage rack 705 and fuel assembly arrangement 700. Spent fuel storage rack 705 may comprise a spent fuel grid including a plurality of cells, such as a first cell 710 and a second cell 720. In some examples, the plurality of cells may be formed by a lattice of supports 780, 790 arranged normal to each other. First cell 710 is illustrated as housing a fuel assembly "F/A" whereas second cell 720 is illustrated as comprising a through-channel 725. Other cells, such as a third cell 730, may house additional fuel assemblies. Still other cells may comprise additional through-channels, such as through-channel 740 and through channel 760. In some examples, each of the plurality of cells may be sized and/or otherwise configured to either house a fuel assembly or to form a through-channel.

Fuel assembly arrangement 700 is illustrated as including a plurality of through-channels alternately positioned in between cells that house fuel assemblies. For example, second cell 720 with through-channel 725 is located in between first cell 710 and third cell 730, both of which are illustrated as housing fuel assemblies. In fuel assembly arrangement 700, all of the cells adjacent to a fuel assembly may include a through-channel. Additionally, all of the cells adjacent to a through-channel may include a fuel assembly. A central cell 750 is shown substantially surrounded by four through-channels, including through-channel 725, through-channel 740, through-channel 760, and through-channel 775. Coolant flowing through the four surrounding through-channels may be used to cool a fuel assembly located in central cell 750.

Figure 8:
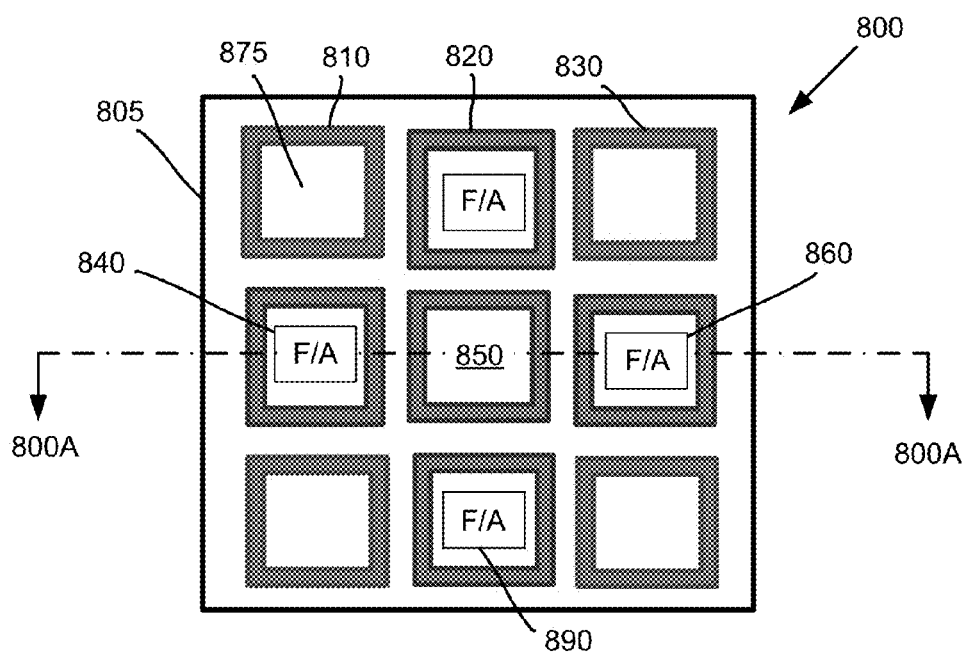
FIG. 8 illustrates a further example spent fuel storage rack and fuel assembly arrangement.

FIG. 8 illustrates a further example of a second spent fuel storage rack 805 and second fuel assembly arrangement 800. A first cell 810 of second spent fuel storage rack 805 is illustrated as comprising a through-channel 875, whereas a second cell 820 of second spent fuel storage rack 805 is illustrated as housing a fuel assembly "F/A." In some examples, each of the plurality of cells of second spent fuel storage rack 805 may be sized and/or otherwise configured to either house a fuel assembly or to form a through-channel.

Second fuel assembly arrangement 800 is illustrated as including a plurality of through-channels alternately positioned between the fuel assemblies such that each fuel assembly may be at least partially surrounded by a plurality of through-channels. Cells located at a perimeter of second spent fuel storage rack 805 may only be surrounded by three through-channels. For example, a fuel assembly associated with second cell 820 may be surrounded by three through-channels, including those formed in first cell 810, third cell 830, and a central cell 850.

An exterior side of second cell 820 may form an exterior wall of second spent fuel storage rack 805. In some examples, in addition to coolant flowing through the plurality of through-channels, fuel assemblies located at the perimeter of second fuel assembly arrangement 800 may be cooled by coolant located around the exterior walls of second spent fuel storage rack 805. In second fuel assembly arrangement 800, all of the cells adjacent to a fuel assembly may include a through-channel. Additionally, all of the cells adjacent to a through-channel may include a fuel assembly. Central cell 850 comprising a through-channel is shown surrounded by four fuel assemblies, including fuel assembly 840, fuel assembly 860, fuel assembly 890, and the fuel assembly contained in second cell 820.

In some examples, second fuel assembly arrangement 800 may comprise spent fuel assemblies arranged in a negative or inverse pattern as compared to fuel assembly arrangement 700. Although fuel assembly arrangement 700 and second fuel assembly arrangement 800 are shown as including alternating fuel assemblies and through-channels for each of the adjacent cells, one of skill in the art would appreciate that either arrangement may include fewer fuel assemblies than that shown based, at least in part, on how long an associate nuclear reactor has been operating. For example, central cell 750 (FIG. 7) may be the last cell designated to receive a spent fuel assembly in fuel assembly arrangement 700 in order to provide for increased spacing between the existing fuel assemblies.

By removing a fuel assembly from one or more of the cells, a through-channel may be selectively formed at any of the cells. For example, the inner surface of one or more of the cells may form a through-hole. Accordingly, the overall flow pattern through one or more of the spent fuel storage racks 705, 805 may be adjusted or modified depending on the placement or arrangement of the spent fuel assemblies in the cells. Additionally, the number of through-channels may be adjusted to account for the age, radioactivity, and/or thermal characteristics of the particular spent fuel being stored. In some examples, after the spent fuel has been stored for a sufficiently long period of time to reduce the radioactivity and/or generation of heat, the number of through-channels in the spent fuel storage racks 705, 805 may be decreased by adding additional spent fuel into one or more of the previously empty cells.

In addition to providing a passageway for gas or fluid to flow between cells and to cool the adjacent spent fuel assemblies, the through-channels in spent fuel storage rack 705 and/or spent fuel storage rack 805 may be configured to provide the function of containing neutrons released from the spent fuel assemblies.

Figure 9:
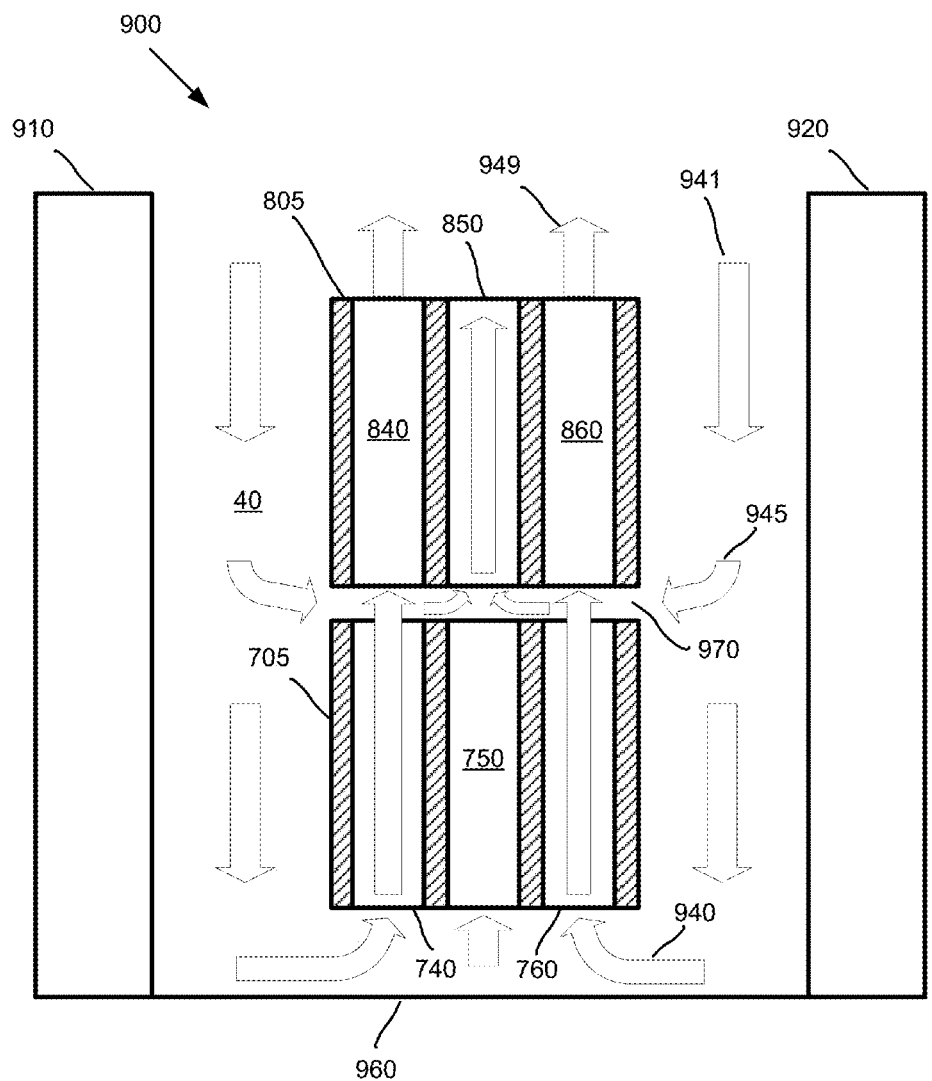
FIG. 9 illustrates an example spent fuel cooling system comprising stacked fuel assemblies.

FIG. 9 illustrates an example spent fuel cooling system 900 comprising stacked fuel assemblies. The fuel assemblies may be arranged in a lower spent fuel rack, such as spent fuel rack 705, stacked on an upper spent fuel rack, such as second spent fuel rack 805. Spent fuel rack 705 is illustrated as a cross-sectional view 700A of fuel assembly arrangement 700 illustrated in FIG. 7, and second spent fuel rack 805 is illustrated as a cross-sectional view 800A of fuel assembly arrangement 800 illustrated in FIG. 8.

Spent fuel cooling system 900 may be configured to provide cooling of spent fuel after a loss of coolant has occurred. In some examples, spent fuel cooling system 900 may be configured to cool the spent fuel entirely by the flow of air 40 or some other type of gas through the stacked fuel racks 705, 805.

Spent fuel cooling system 900 may comprise a plurality of containment walls, such as first containment wall 910 and second containment wall 920. In some examples, four or more walls may substantially surround the stacked fuel racks of spent fuel cooling system 900. In the event of loss of coolant, the spent fuel within the stacked fuel racks may continue to generate heat. An inflow 941 of air (e.g., from within a surrounding containment building) may be drawn down past the containment walls 910, 920 towards a containment floor 960. The inflow 941 may then be directed up through spent fuel rack 705 and second spent fuel rack 805 to remove heat from the spent fuel stored therein.

In the cross-sectional view of spent fuel rack 705, spent fuel is shown located in a central cell 750. In some examples, a portion of airflow 940 passing underneath spent fuel rack 705 may pass through the central cell 750 to cool the spent fuel housed therein. Additional portions of airflow 940 may pass through one or more through-channels of spent fuel rack 705, such as through-channel 740 and/or through-channel 760, located on either side of the spent fuel in central cell 750. The airflow 940 in through-channel 740 and through-channel 760 may be operated to capture neutrons and heat generated from the spent fuel in central cell 750.

After exiting through-channel 740 and/or through-channel 760, airflow 940 may be directed through second spent fuel rack 805. For example, a first portion of airflow 940 exiting through-channel 740 of spent fuel rack 705 may be directed towards spent fuel 840 of second spent fuel rack 805. Similarly, a second portion of airflow 940 exiting through-channel 760 of spent fuel rack 705 may be directed towards spent fuel 860 located in second spent fuel rack 805.

Spent fuel 840 may be located directly above through-channel 740 and spent fuel 860 may be located directly above through-channel 760.

The upper most central cell 850 located directly above central cell 750 may be configured as a through-channel to provide substantially unimpeded flow of coolant that exits from the central cell 750. Similarly, the empty cells associated with through-channel 740, 760 may be configured to provide substantially unimpeded flow of coolant from the empty cells to the upper fuel assemblies 840, 860. In some examples, second spent fuel rack 805 may be separated from or raised above the top of spent fuel rack 705 to form a gap 970. A bypass flow 945 of inflow 941 may be diverted from the generally downward direction of inflow 941 through gap 970 and subsequently directed through one or more spent fuel assemblies and/or through-channels of second spent fuel rack 805, without first passing through first spent fuel rack 705. Bypass flow 945 may be added to airflow 940 which is exiting spent fuel rack 705. In some examples, bypass flow 945 may comprise a relatively cooler air mass as compared to airflow 940 which is exiting spent fuel rack 705, as airflow 940 may have absorbed some of the heat generated from the spent fuel housed in spent fuel rack 705.

An outflow 949 of air that exits second spent fuel rack 805 may have an increased temperature with respect to inflow 941. The temperature difference between inflow 941 and outflow 949 may be used to create a natural circulation of airflow 940 through the stacked fuel assembly to continually cool the spent fuel arrangements. Outflow 949 may be dissipated within the surrounding containment structure where it is cooled down as a result of circulation and convection prior to eventually returning as inflow 941. In some examples, airflow 940 may be augmented or assisted with a fan or blower in order to increase the air mass flow rate.

In addition to placing the spent fuel in alternating patterns in one or more of the spent fuel racks, as shown in FIGS. 7 and 8, in some examples, spent fuel may be preferentially arranged in the spent fuel bay such that newer, more active spent fuel is located below older, less active spent fuel. For example, after a first fuel rack has been filled, or at least partially filled, with a first round of spent fuel, a second fuel rack may be filled with a second round of spent fuel. The first round of spent fuel, having been removed from the reactor core and allowed to cool for a longer period of time, may be less active than the second round of spent fuel which has more recently been removed from the reactor core. The first spent fuel rack may be lifted off the ground of a spent fuel cooling pool and placed on top of the second spent fuel rack.

The mass flow rate of a coolant, such as airflow 940, may be calculated as the product of the cross-sectional area of the coolant flow, the velocity of the coolant flow, and the density of the coolant flow. Additionally, the ability of the coolant to remove heat from the spent fuel may be calculated as a function of the mass flow rate of the coolant and the temperature difference between the spent fuel rods and the coolant.

In some examples, the cooling efficiency of spent fuel cooling system 900 may be improved by locating the more active, or hotter, spent fuel in the lower elevation associated with first spent fuel rack 705. The airflow 940 entering first spent fuel rack 705 may comprise the relatively cooler temperature of inflow 941 which may be used to cool the more active spent fuel. As airflow 940 cools the more active spent fuel contained in first spent fuel rack 705, airflow 940 will absorb the heat from the spent fuel which will in turn may cause the velocity of the airflow to increase. Although the temperature of airflow entering the second spent fuel rack 805 may be greater than the temperature of inflow 941, since it will be travelling at a greater velocity due to the absorption of heat from the first more active spent fuel, it may still be able to effectively cool the spent fuel contained in second spent fuel rack 805.

As used herein, the "activity" of the spent fuel may be understood to refer to the relative age, decay heat, and/or source or radioactivity of the spent fuel. For example, a higher activity or more active spent fuel rod may have been more recently removed from the reactor core than a lower activity or less active spent fuel rod. Similarly, the more active spent fuel rod may be associated with a higher temperature and/or a higher level of radioactivity as compared to the less active spent fuel rod.

In some examples, spent fuel may be arranged in the spent fuel racks by preferentially locating the more active spent fuel in the lower spent fuel rack and by locating the less active spent fuel in the upper spent fuel rack, but without alternately locating the spent fuel as shown in FIGS. 7 and 8. For example, a less active spent fuel rod may be located directly above a more active spent fuel rod. The spent fuel rods may be housed within one or more cells that allow coolant to flow up through the spent fuel rack arrangements and past both the more active spent fuel rod and the less active spent fuel rod.

By storing more active spent fuel rods in the lower storage rack and storing less active spent fuel rods in a second storage rack located above the lower storage rack, a mass flow rate of the coolant through the stacked fuel arrangement may be increased. Additionally, storing more active spent fuel rods in the lower storage rack may increase the heat transfer rate from the more active spent fuel rods.

Depending on the depth of the cooling pool, additional racks may be added to the spent fuel stack assembly. For example, a third spent fuel rack having a similar spent fuel configuration as first spent fuel rack 705 may be mounted on top of second spent fuel rack 805, such that a spent fuel assembly of the third spent fuel rack may be located above each through-channel in central cell 850. The third spent fuel rack may be configured to house additional spent fuel assemblies above some or all of the through-holes in second spent fuel rack 805. Additionally, the third spent fuel rack may be configured with a number of through-holes located above some or all of the spent fuel assemblies, such as spent fuel 840 and spent fuel 860, housed in second spent fuel rack 805.

Figure 10:
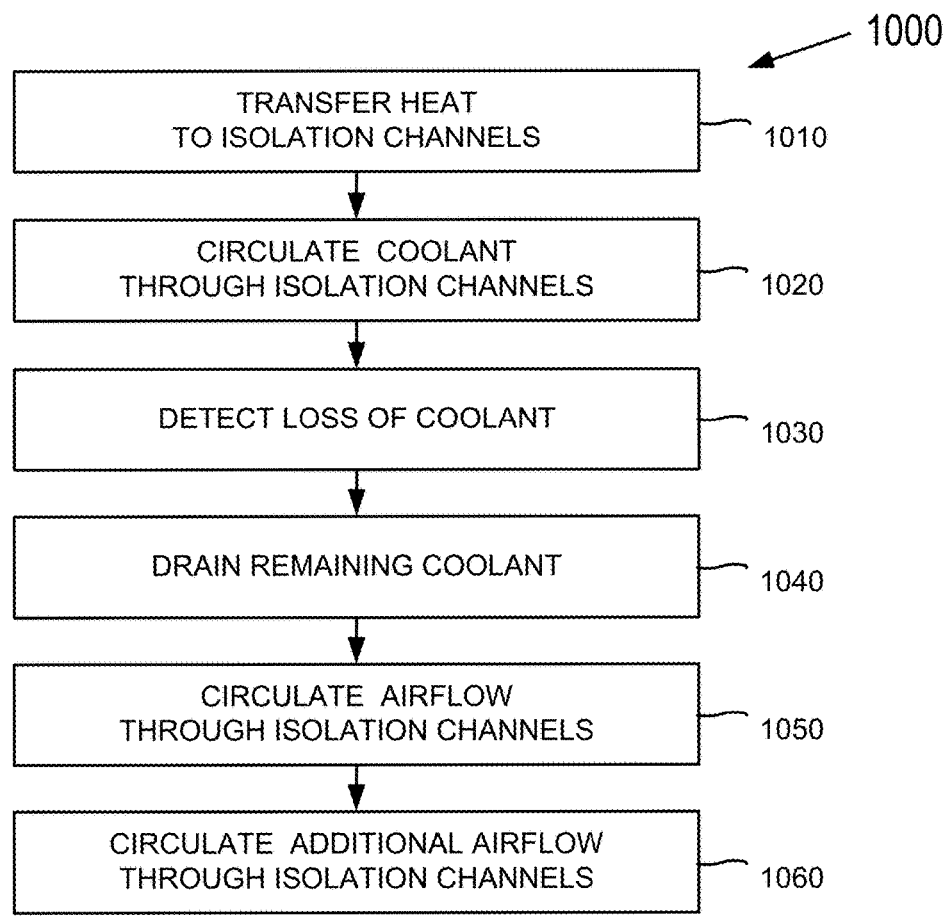
FIG. 10 illustrates an example process of cooling spent fuel.

FIG. 10 illustrates an example process 1000 of cooling spent fuel. At operation 1010, heat released by a plurality of spent fuel assemblies may be transferred to a number of isolation channels located on one or more sides of the spent fuel assemblies. The spent fuel assemblies may be located in cells formed within a spent fuel storage rack located in a cooling pool. The cooling pool may be located in a containment building. In some examples, the isolation channels may be formed around the cells. The isolation channels may provide for retention of both the released heat and neutrons generated by the spent fuel assemblies.

At operation 1020, coolant may be circulated through the isolation channels. The isolation channels may be located between adjacent spent fuel assemblies, such that the coolant may be configured to remove heat from both of the adjacent spent fuel assemblies. In some examples or modes of operation, the coolant may comprise a liquid.

At operation 1030, a loss of coolant may be detected. In some examples, the loss of coolant may be detected by a sensor configured to detect when a level of the spent fuel cooling pool falls below the top surface of the spent fuel storage rack.

At operation 1040, the remaining coolant contained within a spent fuel cooling pool (e.g., located below the bottom fuel assembly) may be removed from the containment building in response to the loss of coolant. In some examples, a valve, pump, suction line, or drain located at or near the floor of the containment structure may be configured to remove the coolant in response to detecting the loss of coolant.

At operation 1050, airflow may be circulated through the isolation channels. The airflow may comprise natural circulation of air or other types of gases that circulate from the containment building and through the spent fuel storage rack. In some examples, the airflow may be augmented with one or more fans or blowers. The airflow may continue to circulate through the isolation channels to continuously remove heat and/or neutrons generated by the spent fuel assemblies without the assistance of any liquid coolant.

At operation 1060, additional airflow may be circulated by an auxiliary air passage. The auxiliary air passage may be formed within one or more walls of the containment structure in order to draw relatively cooler air from above the spent fuel storage rack. In some examples, the auxiliary air passage may connect with a valve at or near the floor of the containment structure. The valve may be located below the spent fuel storage rack. Additionally, some or all of the auxiliary air passage may be located in conduit or ventilation shafts located above the floor and/or outside of the containment structure.

Figure 11:
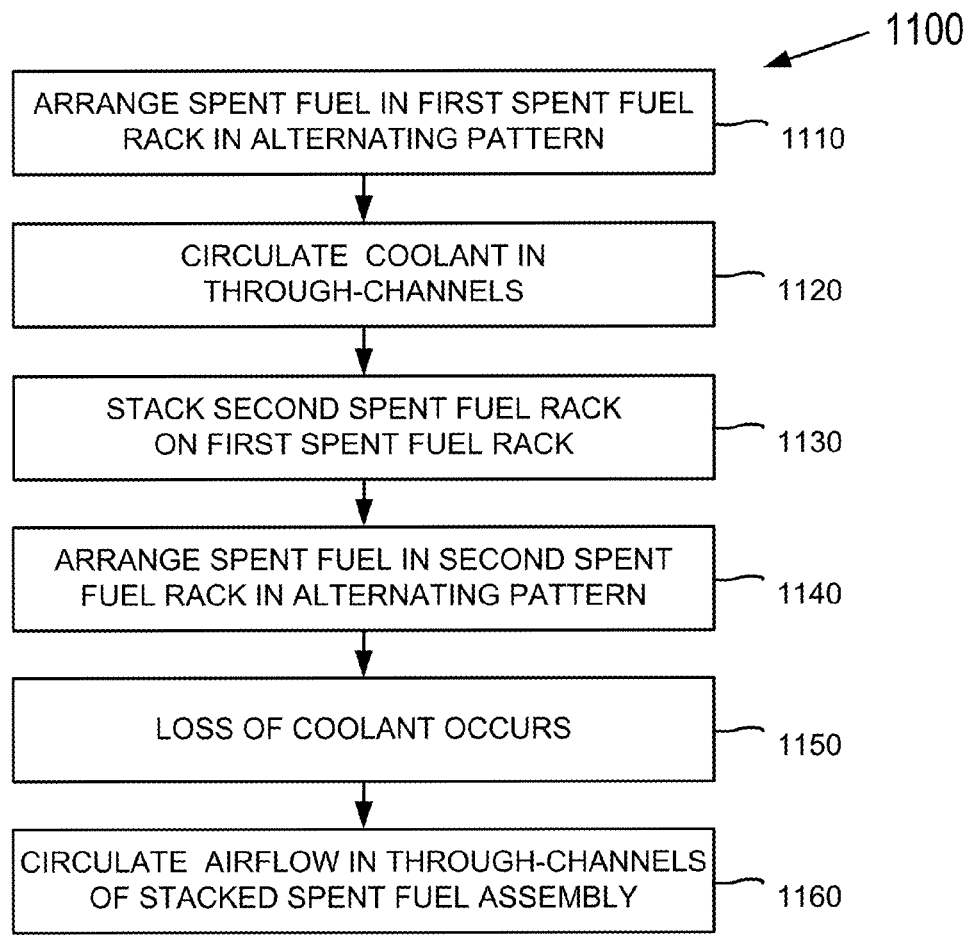
FIG. 11 illustrates a further example process of cooling spent fuel.

FIG. 11 illustrates a further example process 1100 of cooling spent fuel. At operation 1110, spent fuel may be arranged within a first spent fuel storage rack in an alternating pattern, such that every other cell within the first spent fuel storage rack may contain a spent fuel assembly. In some examples, each cell within the first spent fuel storage rack may be configured to contain a spent fuel assembly. Cells which do not contain a spent fuel assembly may provide a through-channel that passes through the first spent fuel storage rack.

In some examples, each of the spent fuel assemblies is at least partially surrounded by a plurality of through-channels. Spent fuel located along a perimeter of the spent fuel storage rack may be partially surrounded by two or three through-channels. Similarly, each of the through-channels may be at least partially surrounded by a plurality of spent fuel assemblies. Through-channels located along a perimeter of the spent fuel storage rack may be partially surrounded by two or three spent fuel assemblies.

At operation 1120, coolant may be circulated through the through-channels. The through-channels may be located between adjacent spent fuel assemblies, such that the coolant may be configured to remove heat from both of the adjacent spent fuel assemblies. In some examples or modes of operation, the coolant may comprise a liquid.

At operation 1130, a second spent fuel storage rack may be stacked on the first spent fuel storage rack. The combined height of the first and second spent fuel storage racks may be lower than the top surface level of the spent fuel cooling pool.

At operation 1140, spent fuel may be arranged within the second spent fuel storage rack in an alternating pattern, such that every other cell within the second spent fuel storage rack may contain a spent fuel assembly. In some examples, each cell within the first spent fuel storage rack may be configured to contain a spent fuel assembly. Cells which do not contain a spent fuel assembly may provide a through-channel that passes through the second spent fuel storage rack. In some examples, one or more of the spent fuel assemblies may be at least partially surrounded by a plurality of through-channels. Additionally, each spent fuel assembly in the second spent fuel storage rack may be located above a through channel in the first spent fuel storage rack.

At operation 1150, a loss of coolant may occur. The loss of coolant may occur as a result of a loss of power, a leak in the containment building, the evaporation of the spent fuel cooling pool, boiling of liquid within the spent fuel cooling pool, draining the coolant from the spent fuel cooling pool, or any combination thereof.

At operation 1160, airflow may be circulated through both the first and second spent fuel storage racks to cool the spent fuel assemblies contained therein The airflow may comprise natural circulation of air or other types of gases that circulate from the containment building and through the spent fuel storage rack. The temperature of the spent fuel assemblies may be maintained at below zircaloy ignition temperatures. Similarly, the airflow may achieve subcriticality of all spent fuel placed in the spent fuel pool rack, even in the absence of any liquid coolant. In some examples, the airflow may be augmented with one or more fans or blowers.

The plurality of through-channels located in the first spent fuel rack may provide a passage for the airflow to be directed towards a similar number of spent fuel assemblies located in the second spent fuel rack, above the first spent fuel rack. In some examples, each of the spent fuel assemblies in the second spent fuel rack may be located above a through-channel associated with the first spent fuel rack.

Additionally, the second spent fuel rack may be vertically spaced above the first spent fuel rack to provide a gap or lateral passageway in which additional airflow may be diverted through the second spent fuel rack without having first passed through the first spent fuel rack. Both the airflow passing through the first spent fuel rack and the additional airflow diverted through the gap may be directed towards the spent fuel assemblies and the through-channels located within the second spent fuel rack.

The airflow may continue to circulate through the stacked spent fuel racks to continuously remove heat and/or neutrons generated by the spent fuel assemblies without the assistance of any liquid coolant. In some examples, one or both of the first and second spent fuel racks may be configured without any solid fixed neutron absorbers.

Figure 12:
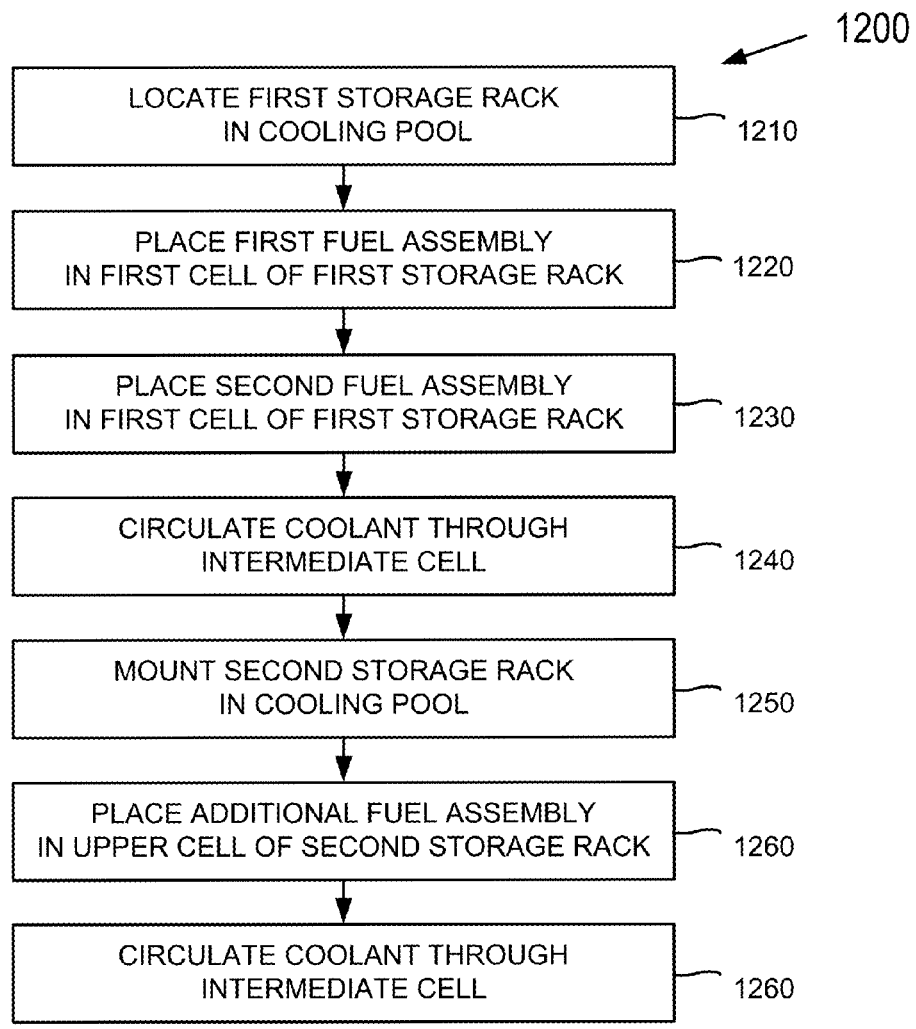
FIG. 12 illustrates an examples process of storing nuclear fuel in a stacked fuel arrangement.

FIG. 12 illustrates an examples process 1200 of storing nuclear fuel in a stacked fuel arrangement. At operation 1210, a first storage rack may be located within a cooling pool. The first storage rack may comprise a first group of cells arranged in a first grid structure, and the first group of cells may be configured to store a first group of fuel assemblies.

At operation 1210, a first fuel assembly may be placed in a first cell of the first grid structure.

At operation 1230, a second fuel assembly may be placed in a second cell of the first grid structure.

At operation 1240, coolant may be circulated through an intermediate cell located between the first cell and the second cell. The intermediate cell may form a through-channel that provides a substantially unimpeded flow of the coolant through the first storage rack to cool the first and second fuel assemblies.

The first group of fuel assemblies may be arranged in the first grid structure in an alternating pattern, so that no two fuel assemblies are located adjacent to each other. In some examples, each fuel assembly in the first grid structure may be surrounded by at least two adjacent empty cells and/or through-channels. Additionally, at least one fuel assembly in the first grid structure may be surrounded by four adjacent empty cells and/or through-channels.

At operation 1250, a second storage rack may be mounted on top of the first storage rack. The second storage rack may comprise a second group of cells arranged in a second grid structure, and the second group of cells may be configured to store a second group of fuel assemblies.

The second group of fuel assemblies may be arranged in the second grid structure in a substantially inverse pattern to the first group of fuel assemblies. For example, an empty cell of the second grid structure may be located above each fuel assembly in the first grid structure. Additionally, at least one empty cell of the second grid structure may be located adjacent to four cells, each of the four cells storing a separate fuel assembly.

At operation 1260, an additional fuel assembly may be placed in an upper cell of the second grid structure. The upper cell may be located directly above the intermediate cell of the first grid structure.

At operation 1270, the coolant may be circulated through the intermediate cell to cool the additional fuel assembly. In some examples, the second storage rack may be mounted on top of the first storage rack by one or more stacking supports that provide a gap in which a bypass flow of coolant joins the coolant circulating through the intermediate cell before cooling the additional fuel assembly located in the upper cell.

A further example fuel storage rack assembly is described as follows for illustrative purposes. The example fuel storage rack assembly may comprise a matrix of fuel cells. The matrix of fuel cells may comprise a first fuel cell located adjacent to a second fuel cell. The first fuel cell and/or the second fuel cell may be sized such that a first gap is formed around the outer wall of a first fuel assembly and a second gap is formed around the outer wall of a second fuel assembly. The first and/or second gap may provide for a containment region having a width of one or more inches. In some examples, the length of the containment region may be approximately equal to the length of the first and/or second fuel assembly.

The first fuel cell may be formed within a first wall. The second fuel cell may be formed within a second wall. At least a portion of the containment region may be formed between the first wall and the second wall. In some examples, one or both of the first wall and second wall may comprise perforations. The perforations may be configured to allow coolant, such as air, located within the first and/or second fuel cell to flow into the containment region and/or to flow between the first and second fuel cells. The perforations in the first wall may be offset, staggered, and/or displaced from perforations in the second wall such that there is no line-of-sight between the first and second fuel assemblies that would allow neutrons generated in one fuel assembly from reaching and/or being absorbed in the other fuel assembly. The perforations may be offset in one of both of the lateral and longitudinal (elevational) directions.

One or more of the example systems, apparatus, and/or configurations described herein may be configured to eliminate the usage of fixed neutron absorbers or soluble boron in the spent fuel pool, and/or to provide for continual neutron and heat transfer in the event of a loss of coolant in the containment cooling pool, by entirely passive means.

Although the examples provided herein have primarily described a pressurized water reactor and/or a light water reactor, it should be apparent to one skilled in the art that the examples may be applied to other types of power systems. For example, one or more of the examples or variations thereof may also be made operable with a boiling water reactor, sodium liquid metal reactor, gas cooled reactor, pebble-bed reactor, and/or other types of reactor designs.

It should be noted that examples are not limited to any particular type of fuel employed to produce heat within or associated with a nuclear reaction. Any rates and values described herein are provided by way of example only. Other rates and values may be determined through experimentation such as by construction of full scale or scaled models of a nuclear reactor system.

While various examples describe cooling spent fuel in a pool of water, some or all of the systems may also be employed in the absence of water. For example, one or more of the embodiments may be located in a substantially dry containment building, and configured to operate in air or an otherwise gaseous environment, or in a containment structure that is partially or completely evacuated. Additionally, one or more of the example systems described herein may be used to store new fuel assemblies that have not yet been spent. For example, one or more of the racks may be used to store fuel assemblies prior to inserting the fuel into a reactor module.

Having described and illustrated various examples herein, it should be apparent that other examples may be modified in arrangement and detail. We claim all modifications and variations coming within the spirit and scope of the subject matter claimed herein.

The invention claimed is:

1. A system for storing nuclear fuel assemblies, comprising:
   a support structure;
   a plurality of cells located within the support structure, wherein the plurality of cells comprise a first cell configured to house a first fuel assembly and a second cell configured to house a second fuel assembly;
   a plurality of compartments separating and forming substantially an entire space between the plurality of cells and configured to provide passageways for coolant entering a bottom end of the support structure to remove heat from the nuclear fuel assemblies;
   a first perforation configured to transfer coolant between the first cell and one or more of the compartments; and
   a second perforation configured to transfer coolant between the second cell and the one or more compartments, wherein at least a portion of the coolant entering the bottom end of the support structure and travelling towards a top end of the support structure is transferred between the plurality of cells and the plurality of compartments.

2. The system of claim 1, wherein the first perforation is located at a first position adjacent a compartment separating the first cell from the second cell, wherein the second perforation is located at a second position adjacent the compartment, and wherein the second position is offset from the first position so that the first perforation and the second perforation do not provide a line-of-sight between the first fuel assembly and the second fuel assembly.

3. The system of claim 2, wherein the plurality of cells are arranged in a grid pattern associated with an X-Y plane, wherein the plurality of fuel cells are configured to store the plurality of fuel assemblies in a Z direction normal to the X-Y plane, and wherein the plurality of compartments comprise:
   a first set of compartments having a cross-sectional length oriented in the X direction of the X-Y plane extending substantially an entire X direction length of the cells;
   a second set of compartments having a cross-sectional length oriented in the Y direction of the X-Y plane extending substantially an entire X direction length of the cells; and
   the first and second compartments have a cross-sectional length in the Z direction substantially an entire length of the fuel assemblies.

4. The system of claim 3, further comprising a third perforation configured to transfer coolant between one or more of the first set of compartments and one or more of the second set of compartments.

5. The system of claim 3, wherein the second position is offset from the first position in the X-Y plane.

6. The system of claim 3, wherein the second position is offset from the first position in the Z direction.

7. The system of claim 1, further comprising a number of multiple heat sinks attached to the support structure and configured to radiate heat away from the fuel assemblies.

8. The system of claim 1, wherein the support structure comprises:
   a first storage rack comprising a first set of cells configured to house a first group of fuel assemblies, including the first cell and the first fuel assembly; and
   a second storage rack mounted on top of the first storage rack and comprising a second set of cells configured to house a second group of fuel assemblies, wherein the second set of cells includes an upper cell located directly above the first cell, and wherein the upper cell is configured as a through-channel to provide substantially unimpeded flow of coolant from the first cell.

9. The system of claim 8, wherein an upper fuel assembly housed in the second set of cells is located directly above an empty cell of the first storage rack, and wherein the empty cell provides an additional through-channel to provide substantially unimpeded flow of coolant from the empty cell to the upper fuel assembly.

10. The system of claim 9, further comprising:
    a sensor configured to monitor when a level of coolant at least partially surrounding the support structure falls beneath a minimum threshold; and
    a ventilation system configured to direct air into the additional through-channel to cool the upper fuel assembly in response to the monitored level of coolant falling beneath the minimum threshold.

11. A system for storing nuclear fuel assemblies, comprising:
    a support structure;
    a plurality of cells located within the support structure configured to individually house the nuclear fuel assemblies; and
    a plurality of compartments separating the plurality of cells and configured to provide passageways for coolant entering a bottom end of the support structure to remove heat from the nuclear fuel assemblies,
    wherein the plurality of cells are arranged in a grid pattern associated with an X-Y plane, wherein the plurality of fuel cells are configured to store the plurality of fuel assemblies in a Z direction normal to the X-Y plane, and wherein the plurality of compartments comprise:
    a first set of compartments having a cross-sectional length oriented in the X direction of the X-Y plane extending substantially an entire X direction length of the cells;

a second set of compartments having a cross-sectional length oriented in the Y direction of the X-Y plane extending substantially an entire Y direction length of the cells; and the first and second compartments having a cross-sectional length oriented in the Z direction extending substantially an entire Z direction length of the fuel assemblies.

12. The system of claim 11 wherein the compartments form an entire space between the plurality of cells.

13. The system of claim 11, wherein a first one of the perforations is located at a first position adjacent a compartment separating the first cell from the second cell, wherein a second one of the perforations is located at a second position adjacent the compartment, and wherein the second position is offset from the first position so that the first perforation and the second perforation do not provide a line-of-sight between the first fuel assembly and the second fuel assembly.

14. The system of claim 13, wherein a third one of the perforations is configured to transfer coolant between one or more of the first set of compartments and one or more of the second set of compartments.

15. The system of claim 13, wherein the second position is offset from the first position in the X-Y plane.

16. The system of claim 13, wherein the second position is offset from the first position in the Z direction.

17. The system of claim 11, further comprising multiple heat sinks attached to the support structure and configured to radiate heat away from the fuel assemblies.

* * * * *

UNITED STATES PATENT AND TRADEMARK OFFICE
CERTIFICATE OF CORRECTION

PATENT NO. : 10,468,144 B2  
APPLICATION NO. : 14/820389  
DATED : November 5, 2019  
INVENTOR(S) : Steven J. Mirsky and Jose N. Reyes, Jr.

Page 1 of 1

It is certified that error appears in the above-identified patent and that said Letters Patent is hereby corrected as shown below:

On the Title Page

Item (72) Inventors, delete "Stephen" and insert -- Steven --, therefor.

Signed and Sealed this  
Twentieth Day of October, 2020

Andrei Iancu  
*Director of the United States Patent and Trademark Office*